United States Patent
He et al.

(10) Patent No.: US 10,739,859 B2
(45) Date of Patent: Aug. 11, 2020

(54) DISPLAY DEVICE AND HAPTIC FEEDBACK DISPLAY METHOD THEREOF

(71) Applicant: Shanghai Tianma Micro-Electronics Co., Ltd., Shanghai (CN)

(72) Inventors: Yongxin He, Shanghai (CN); Gang Liu, Shanghai (CN); Fei Li, Shanghai (CN); Haipeng Ke, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/233,532

(22) Filed: Dec. 27, 2018

(65) Prior Publication Data

US 2020/0097085 A1    Mar. 26, 2020

(30) Foreign Application Priority Data

Sep. 25, 2018   (CN) .......................... 2018 1 1118515

(51) Int. Cl.
*G06F 3/01*        (2006.01)
*G06F 3/041*       (2006.01)
(Continued)

(52) U.S. Cl.
CPC ............ *G06F 3/016* (2013.01); *G06F 3/0412* (2013.01); *G06F 3/0414* (2013.01);
(Continued)

(58) Field of Classification Search
CPC ...... G06F 3/016; G06F 3/0412; G06F 3/0414; G06F 3/0488; G06F 3/0416; G06F 2203/04102
See application file for complete search history.

(56) References Cited

U.S. PATENT DOCUMENTS

| | | | |
|---|---|---|---|
| 2009/0066672 A1* | 3/2009 | Tanabe | G06F 1/1626 345/176 |
| 2009/0128503 A1* | 5/2009 | Grant | G06F 3/04886 345/173 |

(Continued)

FOREIGN PATENT DOCUMENTS

| | | |
|---|---|---|
| CN | 101801706 A | 8/2010 |
| CN | 103902081 A | 7/2014 |

(Continued)

*Primary Examiner* — Md Saiful A Siddiqui (74) *Attorney, Agent, or Firm* — Anova Law Group PLLC (57) ABSTRACT

A display device and a haptic feedback display method of the display device are provided. The display device includes a display panel including a display region, and a touch-control sensor disposed at least in the display region and used to detect a touch-control operation. The display device also includes a control unit electrically connected to at least the display panel. The control unit is used to change an operation mode of the display device, and according to the touch-control operation detected by the touch-control sensor, to adjust a display object of the display panel. The operation mode includes at least a blind operation mode. Further, the display device includes at least one button structure disposed in the display region. In the blind operation mode, a touch surface of the display device is in a raised state at a location of a button structure of the at least one button structure.

18 Claims, 9 Drawing Sheets

(51) Int. Cl.
*G06F 3/0488* (2013.01)
*H04M 1/725* (2006.01)

(52) U.S. Cl.
CPC .......... *G06F 3/0416* (2013.01); *G06F 3/0488*
(2013.01); *G06F 2203/04102* (2013.01);
*H04M 1/72594* (2013.01)

(56) References Cited

U.S. PATENT DOCUMENTS

| | | | |
|---|---|---|---|
| 2010/0162109 A1* | 6/2010 | Chatterjee | G06F 3/016 |
| | | | 715/702 |
| 2011/0304550 A1* | 12/2011 | Romera Jolliff | G06F 3/016 |
| | | | 345/168 |
| 2012/0105333 A1* | 5/2012 | Maschmeyer | G06F 3/016 |
| | | | 345/173 |
| 2014/0253687 A1* | 9/2014 | Lee | G06F 3/0488 |
| | | | 348/46 |
| 2017/0068318 A1 | 3/2017 | McClure et al. | |
| 2017/0192642 A1* | 7/2017 | Fishman | G06F 3/0488 |

FOREIGN PATENT DOCUMENTS

| | | |
|---|---|---|
| CN | 105204687 A | 12/2015 |
| CN | 105843539 A | 8/2016 |

\* cited by examiner

DISPLAY DEVICE AND HAPTIC FEEDBACK DISPLAY METHOD THEREOF

CROSS-REFERENCES TO RELATED APPLICATIONS

This application claims the priority of Chinese patent application No. 201811118515.6, filed on Sep. 25, 2018, the entirety of which is incorporated herein by reference.

FIELD OF THE DISCLOSURE

The present disclosure generally relates to the field of display technology and, more particularly, relates to a display device and a haptic feedback display method thereof.

BACKGROUND

In an existing display device, a user has to always view the screen when performing operations on the screen. However, in certain cases it is inconvenient for the user to view the screen (e.g., the user is driving, etc.), and, thus, the user cannot perform the operation to select a corresponding function.

Therefore, there is a need to provide a display device capable of guiding the finger touch-control from the user, such that the user can perform corresponding operations without viewing the screen. The disclosed display method and display device are directed to solve one or more problems set forth above and other problems.

BRIEF SUMMARY OF THE DISCLOSURE

One aspect of the present disclosure provides a display device. The display device includes a display panel including a display region and a touch-control sensor. The touch-control sensor is disposed at least in the display region and is used to detect a touch-control operation. The display device also includes a control unit electrically connected to at least the display panel. The control unit is used to change an operation mode of the display device, and according to the touch-control operation detected by the touch-control sensor, to adjust a display object of the display panel. The operation mode includes at least a blind operation mode. Further, the display device includes at least one button structure disposed in the display region. In the blind operation mode, a touch surface of the display device is in a raised state at a location of a button structure of the at least one button structure.

Another aspect of the present disclosure provides a haptic feedback display method of a display device. The method includes providing the display device. The display device includes a display panel including a display region and a touch-control sensor. The touch-control sensor is disposed at least in the display region and is used to detect a touch-control operation. The display device also includes a control unit electrically connected to at least the display panel. The control unit is used to change an operation mode of the display device, and according to the touch-control operation detected by the touch-control sensor, to adjust a display object of the display panel. The operation mode includes at least a blind operation mode. Further, the display device includes at least one button structure disposed in the display region. In the blind operation mode, a touch surface of the display device is in a raised state at a location of a button structure of the at least one button structure. The method also includes in the blind operation mode, according to the touch-control operation performed on the button structure and detected by the touch-control sensor, determining, by the control unit, whether to activate a touch-control display function of the display panel corresponding to the button structure.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
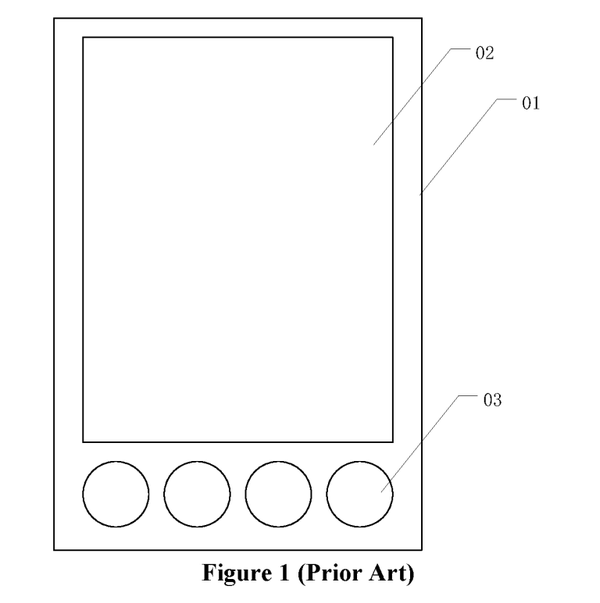
FIG. 1 illustrates a schematic top view of a display device.

FIG. 1 illustrates a schematic top view of an existing display device. Referring to FIG. 1, the existing display device includes a case 01, a display panel 02, and a plurality of buttons 03. Each button 03 corresponds to a different touch-control display function of the display panel. Referring to FIG. 1, the existing display device can be used in an in-vehicle central control system, etc. In the existing display device, because the button occupies a part of the space of the display device, the space occupied by the display panel is substantially small, and the function of the display panel corresponding to each button on the display device is substantially simple. In addition, in the existing display device, when the user switches the display object on the display panel or switches the touch-control display function, the user has to view the display device. However, in practical applications, e.g., when the user is driving, it is not always convenient for the user to always view the display device.

Figure 2:
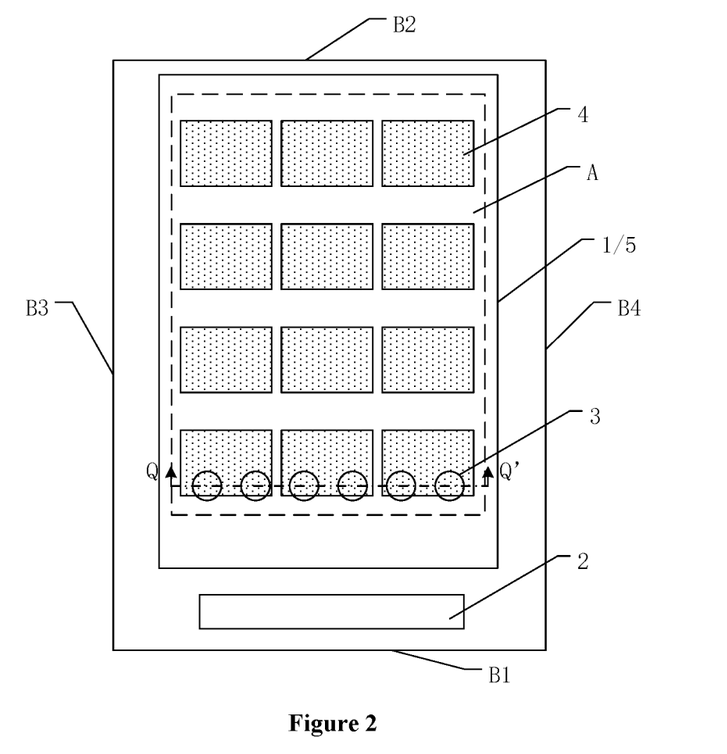
FIG. 2 illustrates a schematic top view of an exemplary display device consistent with disclosed embodiments of the present disclosure.
Figure 3:
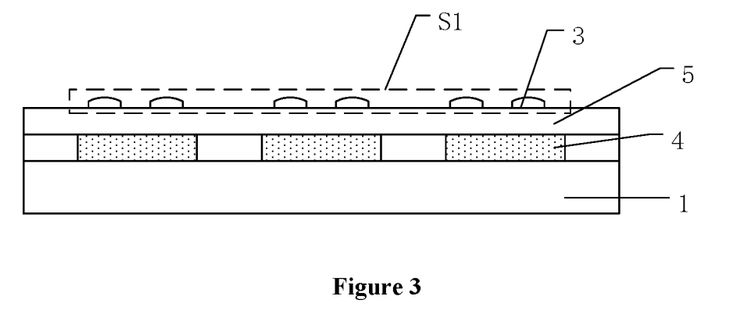
FIG. 3 illustrates a schematic Q-Q' sectional view of an exemplary display device in FIG. 2 consistent with disclosed embodiments of the present disclosure.

FIG. 2 illustrates a schematic top view of an exemplary display device consistent with disclosed embodiments of the present disclosure; and FIG. 3 illustrates a schematic Q-Q' sectional view of the display device in FIG. 2. Referring to FIGS. 2-3, the display device may include a display panel 1, a control unit 2, and at least one button structure 3. The display panel 1 may include a display region A and a touch-control sensor 4. The touch-control sensor 4 may be disposed at least in the display region A, and may be used to detect a touch-control operation. The control unit 2 may be electrically connected to at least the display panel 1. The control unit 2 may be used to change an operation mode of the display device, and to adjust a display object of the display panel 1 according to the touch-control operation detected by the touch-control sensor 4. The operation mode may include at least a blind operation mode. The button structure 3 may be disposed in the display region A. In the blind operation mode, a touch surface S1 of the display device at a location of the button structure 3 may be in a raised state. In certain embodiments, the display device may further include a glass cover 5.

In one embodiment, referring to FIGS. 2-3, the display device may include a plurality of button structures 3 and a plurality of touch-control sensors 4. Each button structure 3 may be disposed in the display region A. The touch-control sensor 4 may be a touch-control electrode for detecting one or more of the touch-control operation and the touch location. The touch-control electrode may implement the touch-control function using one of a self-capacitance method and a mutual-capacitance method. When the touch-control sensor 4 detects the touch-control operation, the touch-control sensor 4 may have a function of detecting a touch pressure. The touch-control electrode using one of the self-capacitance method and the mutual-capacitance method is used as an example, which is not limited by the present disclosure and can be determined according to practical applications.

In the blind operation mode, the button structure 3 may include the raised state. The user may perform the touch-control operation on the display device according to the raised button structure 3. The touch surface S1 may be a surface directly touched by the user of the display device. The touch-control sensor 4 and the button structure 3 shown in FIGS. 2-3 are used as an example, and the size of the touch-control sensor 4 and the size of the button structure 3 are not limited by the present disclosure. In one embodiment, the size of the touch-control sensor 4 may be smaller than the size of the button structure 3. In another embodiment, the size of the touch-control sensor 4 may be equal to the size of the button structure 3.

In one embodiment, in the blind operation mode, the button structure in the display region may be set as a raised structure. When it is inconvenient for the user to directly view the display panel to perform the touch-control operation, the raised button structure may provide guidance for the user. In other words, according to the guidance of the raised button structure, the user may perform the touch-control operation on the display panel by touching the raised button structure without directly viewing the display panel. Therefore, the user may still be capable of performing the operation on the display panel in a case where it is inconvenient for the user to view the display panel, thereby improving the user convenience. In addition, the button structure in the disclosed embodiments may be disposed in the display region of the display panel, and may interact with the touch-control sensor to implement the touch-control operation, which may facilitate to enrich the function corresponding to the button structure, and at the same time, to reduce the frame of the display device and increase the area of the display region of the display device, thereby improving the user experience.

In certain embodiments, referring to FIG. 3, the display device may further include the glass cover 5 disposed on a side of the display panel 1 close to the touch surface S1.

The button structure 3 may be disposed on a side of the glass cover 5 away from the display panel 1, and the button structure 3 may have a block shape. The button structure 3 may be made of a hard material or an elastic material.

In one embodiment, the button structure may be disposed on the side of the glass cover away from the display panel, and, thus, the existing film layer structure inside the display panel may not desire to be modified. The disposition of the button structure on the side of the glass cover may guide the user in the blind operation mode and may be applicable to most existing display panels, thereby improving the utilization of the display panel and reducing the production cost of the display device.

In certain embodiments, referring to FIG. 3, a thickness of the button structure 3 in a direction perpendicular to a panel plane of the display panel 1 may be in a range of approximately 0.3 mm-1.0 mm.

In one embodiment, the thickness of the button structure may be substantially small. Therefore, the button structure may not affect the display performance of the display panel in a normal operation mode, and at the same time, may guide the user in the blind operation mode, thereby improving the utilization of the display panel and reducing the production cost of the display panel.

In certain embodiments, referring to FIG. 2, the display panel 1 may include oppositely disposed first side B1 and second side B2, and oppositely disposed third side B3 and fourth side B4. The button structure 3 may be disposed on at least one side of the display panel 1.

In one embodiment, the button structure 3 may be disposed on any one side of the display panel 1. In another embodiment, according to practical applications, the button structure 3 may be disposed on multiple sides of the display panel 1. In one embodiment, in the in-vehicle central control system, the button structure 3 may be disposed on a side near the driver's seat. In another embodiment, the button structure 3 may be disposed on each side near the driver's seat or the passenger's seat, which is not limited by the present disclosure and may be determined according to practical applications.

In one embodiment, the button structure may be disposed on at least one side of the display panel, which may facilitate the user to touch the button structure, to improve the user experience, and at the same time, to reduce the influence on the screen display of the display panel.

In certain embodiments, referring to FIG. 2, the button structure 3 may be a transparent button structure. The button structure 3 may be made of a material including glass or plastic. In one embodiment, the button structure may be disposed on the glass cover, and the button structure may be a transparent button structure. Therefore, the display performance of the display panel may not be affected while guiding the user to perform the touch-control operation. The button structure made of the material including glass or plastic is used as an example, which is not limited by the present disclosure and may be determined according to practical applications.

In one embodiment, referring to FIGS. 2-3, a projection of the button structure 3 onto the panel plane of the display panel may overlap with a projection of the touch-control sensor 4 onto the panel plane of the display panel. In one embodiment, referring to FIG. 2, the plurality of touch-control sensors 4 may be evenly distributed in the display panel.

Figure 4:
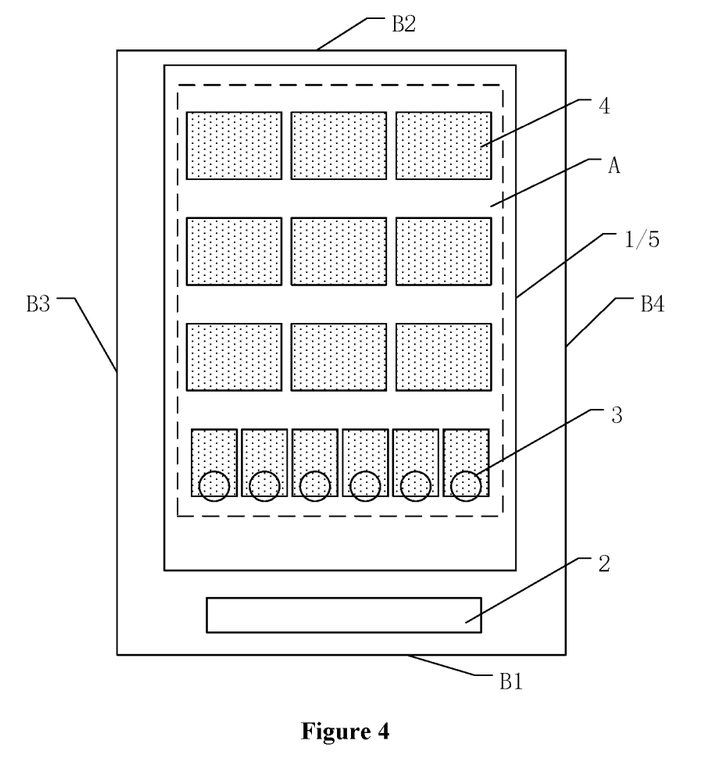
FIG. 4 illustrates a schematic top view of another exemplary display device consistent with disclosed embodiments of the present disclosure.

FIG. 4 illustrates a schematic top view of another display device consistent with disclosed embodiments of the present disclosure. In one embodiment, referring to FIG. 4, a distribution density of the touch-control sensors 4 in the display region A may include at least a first distribution density p1 and a second distribution density p2, and the first distribution density p1 may be greater than the second distribution density p2. At least at the location of the button structure 3, the distribution density of the touch-control sensors 4 may be the first distribution density p1.

In one embodiment, referring to FIG. 4, the density of the touch-control sensors 4 at the location of the button structure 3 may be greater than the density of the touch-control sensors 4 at other locations, which may increase the touch-control sensitivity at the location of the button structure and may improve the accuracy of detecting the user's touch-control operation, thereby improving the user experience.

Figure 5:
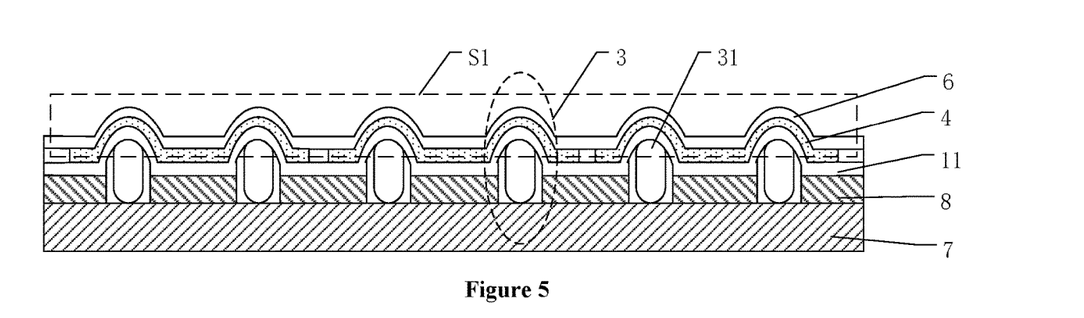
FIG. 5 illustrates another schematic Q-Q' sectional view of an exemplary display device in FIG. 2 consistent with disclosed embodiments of the present disclosure.

FIG. 5 illustrates another schematic Q-Q' sectional view of the display device in FIG. 2 consistent with disclosed embodiments of the present disclosure. In certain embodiments, referring to FIGS. 2 and 5, the display panel 1 may be a flexible display panel. The button structure 3 may be disposed on a side of the display panel away from the touch surface. The button structure 3 may include an actuator 31, and the actuator 31 may include at least a raised state. When the actuator 31 is in the raised state, the flexible display panel at the location of the button structure 3 may form a protrusion. In certain embodiments, a bottom support part 7 and a screen support part 8 may be disposed under the flexible display panel 11, and the touch-control sensor 4 and a flexible cover 6 may be disposed above the flexible display panel 11. The bottom support part 7 may be disposed under the flexible display panel 11, and the bottom support part 7 may be disposed as an entire surface for disposing a plurality of screen support parts 8 and a plurality of actuators 31. A gap may be formed between adjacent screen support parts 8 to dispose the actuator 31. When the actuator 31 is deformed, the flexible display panel 11 corresponding to the actuator 31 may be deformed to form a protrusion (a corresponding deformation, including protrusion or recessed, may be formed accompanying with the deformation of the actuator 31). Under ideal conditions, a corresponding flexible display panel 11 above the screen support part 8 may not be deformed. However, in practical applications, because the actuator 31 is deformed, the corresponding flexible display panel at the location of the surrounding screen support parts 8 may be deformed to a certain extent. The deformation of the corresponding flexible display panel at the location of the screen support part 8 may be substantially small. The farther away from the actuator 31, the smaller the deformation of the flexible display panel. The deformation of the flexible display panel at the location far away from the actuator 31 may be negligible. In one embodiment, the actuator 31 may be in a sheet form, which may facilitate to reduce a thickness of the display device.

In one embodiment, referring to FIGS. 2 and 5, in the blind operation mode, the raised actuator 31 may cause the flexible display panel 11, the touch-control sensor 4, and the flexible cover 6 to form protrusions, and, thus, the touch surface S1 at the location of the raised actuator 31 may form the raised button structure 3.

In certain embodiments, the upper surface of the actuator 31 on the side close to the flexible display panel 11 and the lower surface of the actuator 31 on the side away from the flexible display panel 11 may be deformed. By applying voltage signals with opposite polarity, the upper surface of the actuator 31 may be in a stretched state, and the lower surface of the actuator 31 may be in a shrunken state. In other words, the actuator may be in a raised state, and, thus, the surface of the flexible display panel 11 may be in the raised state. The present disclosure may merely exemplify one mode in which the actuator 31 is in a raised state, and the raised state of the actuator in the present disclosure may refer to a state where the deformed actuator causes the surface of the flexible display panel to form a protrusion. The type of the employed actuator, and the type of the deformation of the actuator which causes the surface of the flexible display panel to form the protrusion may not be limited by the present disclosure.

In one embodiment, the actuator may be disposed under the flexible display panel. When the actuator is in the raised state, the raised button structure may be formed on the touch surface of the flexible display panel. When it is inconvenient for the user to directly view the display panel to perform the touch-control operation, the raised button structure may provide guidance for the user. According to the guidance of the button structure, the user may perform the touch-control operation on the display panel by touching the raised button structure without directly viewing the display panel. Therefore, the user may still be capable of performing operation on the display panel in a case where it is inconvenient to view the display panel, thereby improving the user convenience.

In certain embodiments, referring to FIG. 4, in the blind operation mode, the actuator 31 may have a vibration state. In one embodiment, when the display device is in the blind operation mode, the actuator 31 may be stretched and shrunken by supplying a varying electric field to the actuator 31, and, thus, the actuator 31 may be vibrated. The continuous vibration state of the actuator may be generally produced by providing an alternating electric field to the actuator. In one embodiment, the actuator may have a vibration state, and may provide a substantially strong haptic feedback to the user, thereby achieving the purpose of prompting the user.

Figure 6:
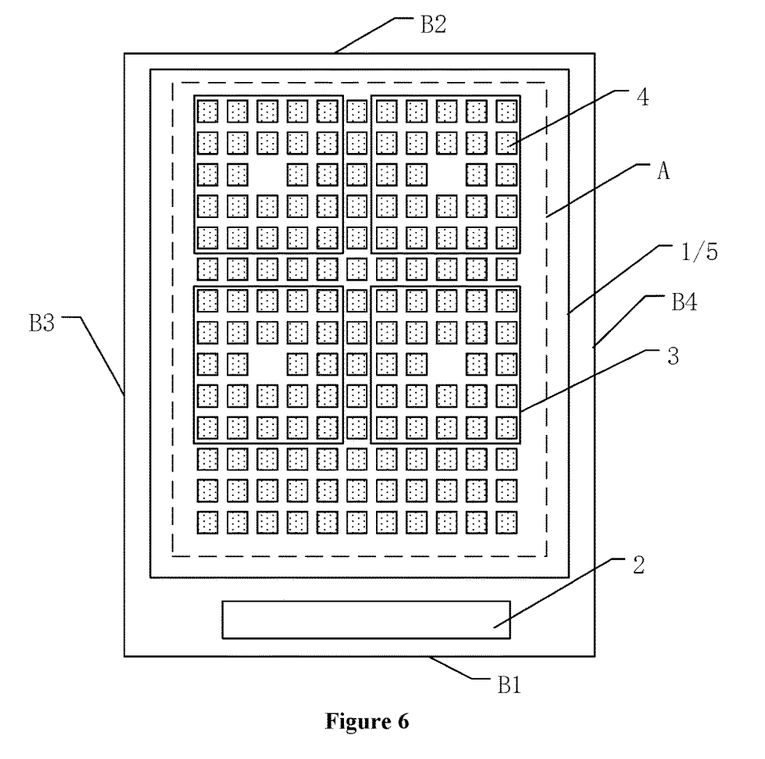
FIG. 6 illustrates a schematic top view of another exemplary display device consistent with disclosed embodiments of the present disclosure.
Figure 7:
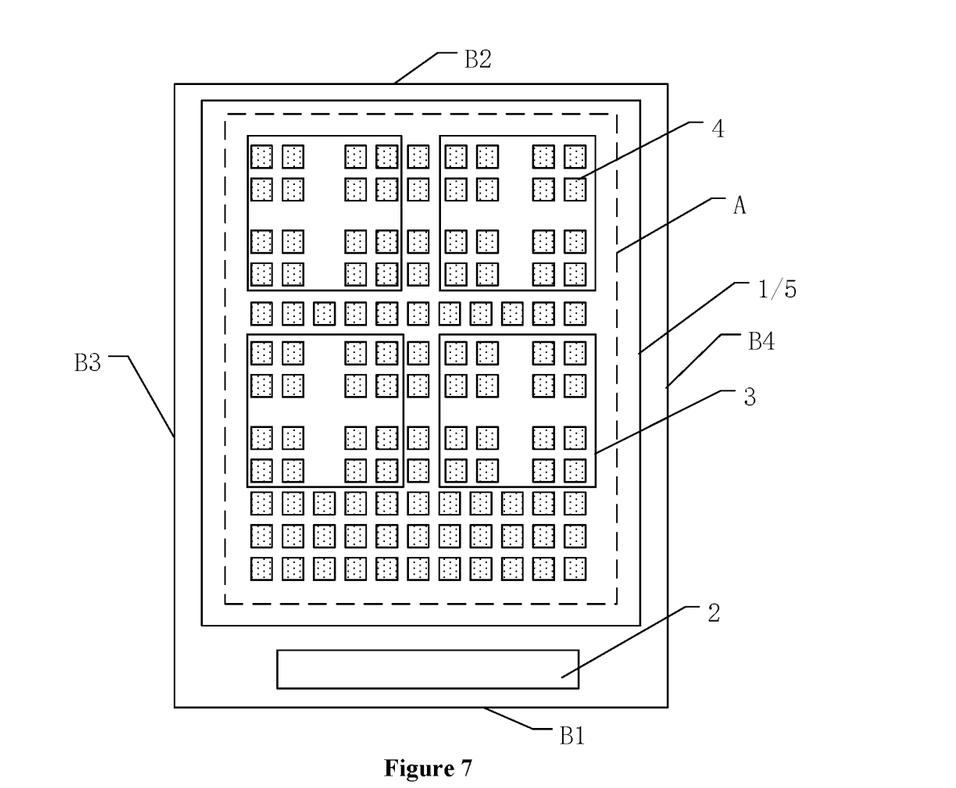
FIG. 7 illustrates a schematic top view of another exemplary display device consistent with disclosed embodiments of the present disclosure.

FIG. 6 illustrates a schematic top view of a display device consistent with disclosed embodiments of the present disclosure; and FIG. 7 illustrates a schematic top view of another display device consistent with disclosed embodiments of the present disclosure. In one embodiment, referring to FIGS. 6-7, due to the presence of the actuator 31, the flexible display panel 11 at the location of the button structure 3 may be deformed to form a protrusion or a recess. However, the protrusion or the recess may affect the touch-control sensor 4. For example, the touch-control lead of the touch-control sensor 4 may be broken, or the electrical connection between the touch-control electrode and the touch-control lead employed by the touch-control sensor 4 may fail, etc. Therefore, the touch-control sensors 4 may not be disposed at a location where the button structure 3 is most deformed, that is, at the center location of the button structure 3. In one embodiment, referring to FIG. 6, the touch-control sensors 4 may be disposed surrounding the periphery of the button structure 3. In another embodiment, referring to FIG. 7, the touch-control sensors 4 may be disposed in groups at locations near the button structure 3. Therefore, the influence of the deformed flexible display panel on the touch-control sensor may be reduced or eliminated to ensure the normal operation of the touch-control sensor, thereby improving the user reliability.

Figure 8:
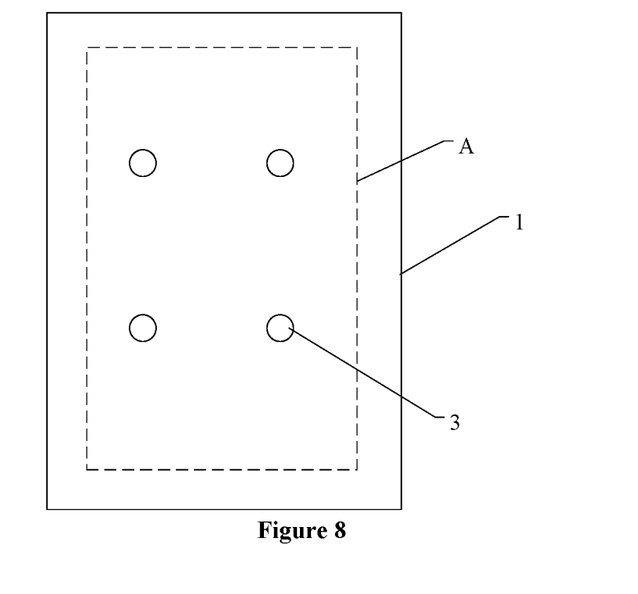
FIG. 8 illustrates a schematic top view of another exemplary display device consistent with disclosed embodiments of the present disclosure.

FIG. 8 illustrates a schematic top view of another display device consistent with disclosed embodiments of the present disclosure. In certain embodiments, referring to FIG. 8, the at least one button structure 3 may be evenly distributed in the display region A.

In one embodiment, the at least one button structure 3 may be evenly distributed in the display region. Therefore, the distance between adjacent button structures may increase, and the button structures may be obviously distinct from each other, which may facilitate to provide touch-control guidance for the user. In addition, the at least one button structure may be evenly distributed in the display region, which may facilitate to improve the change of the display performance caused by the deformation of the display panel.

Figure 9:
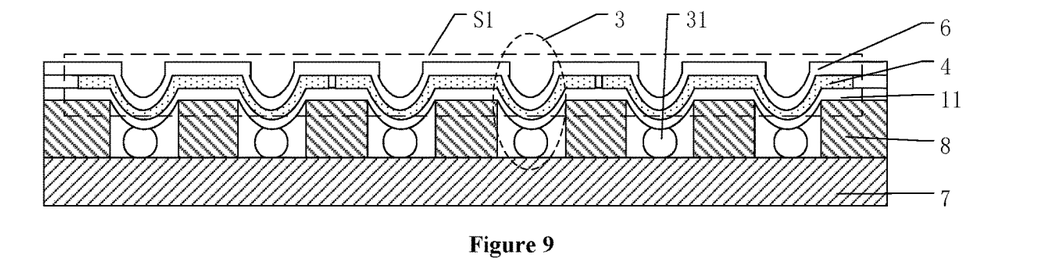
FIG. 9 illustrates another schematic Q-Q' sectional view of an exemplary display device in FIG. 2 consistent with disclosed embodiments of the present disclosure.

FIG. 9 illustrates another schematic Q-Q' sectional view of the display device in FIG. 2 consistent with disclosed embodiments of the present disclosure. In certain embodiments, referring to FIG. 9, in the blind operation mode, the actuator 31 may further include a recessed state. When the actuator 31 is in the recessed state, the flexible display panel 11 at the location of the button structure 3 may form a recess.

In one embodiment, referring to FIG. 9, the actuator 31 may be in adhesive contact with the flexible display panel 11, and, thus, the flexible display panel 11 may be deformed accompanying with the actuator 31. In other words, when the actuator 31 is in a raised state, the flexible display panel 11 may be in a raised state; and when the actuator 31 is in a recessed state, the flexible display panel 11 may be in a recessed state. In one embodiment, in the blind operation mode, the recessed actuator 31 may cause the flexible display panel 11, the touch sensor 4, and the flexible cover 6 to form a recess, and, thus, the touch surface S1 at the location of the recessed actuator 31 may form the recessed button structure 3.

In certain embodiments, the upper surface of the actuator 31 on the side close to the flexible display panel 11 and the lower surface of the actuator 31 on the side away from the flexible display panel 11 may be deformed. By applying voltage signals with opposite polarity, the upper surface of the actuator 31 may be in a shrunken state, and the lower surface of the actuator 31 may be in a stretched state. Therefore, the surface of the flexible display panel 11 may be in the recessed state. The present disclosure may merely exemplify one mode in which the actuator 31 is in a recessed state, and the recessed state of the actuator in the present disclosure may refer to a state where the deformed actuator causes the surface of the flexible display panel to form a recess. The type of the employed actuator, and the type of the deformation of the actuator which causes the surface of the flexible display panel to form a recess may not be limited by the present disclosure.

In one embodiment, the actuator may be disposed under the flexible display panel. When the actuator is in the shrunken state, the recessed button structure may be formed on the touch surface of the flexible display panel. When it is inconvenient for the user to directly view the display panel to perform the touch-control operation, the recessed button structure may provide guidance for the user. According to the guidance of the recessed button structure, the user may perform the touch-control operation on the display panel by touching the recessed button structure without directly viewing the display panel. Therefore, the user may still be capable of performing operation on the display panel in a case where it is inconvenient to view the display panel, thereby improving the user convenience.

Figure 10:
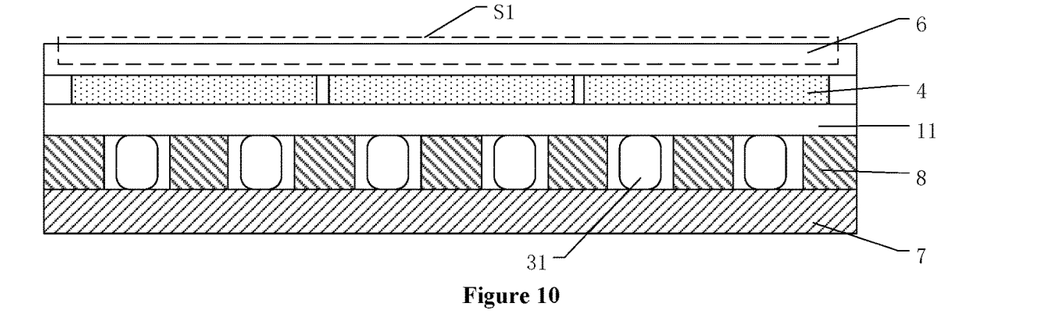
FIG. 10 illustrates another schematic Q-Q' sectional view of an exemplary display device in FIG. 2 consistent with disclosed embodiments of the present disclosure.

FIG. 10 illustrates another schematic Q-Q' sectional view of the display device in FIG. 2 consistent with disclosed embodiments of the present disclosure. In certain embodiments, referring to FIG. 10, the operation mode may further include a normal operation mode. In the normal operation mode, the actuator 31 may be in a flat state.

In one embodiment, the display device may include a normal operation mode, and the user may directly view the display panel. In the normal operation mode, the actuator may be in a flat state, and the entire touch surface of the flexible display panel may be in a flat state, which may have a desired display performance and may improve the user experience.

Figure 11:
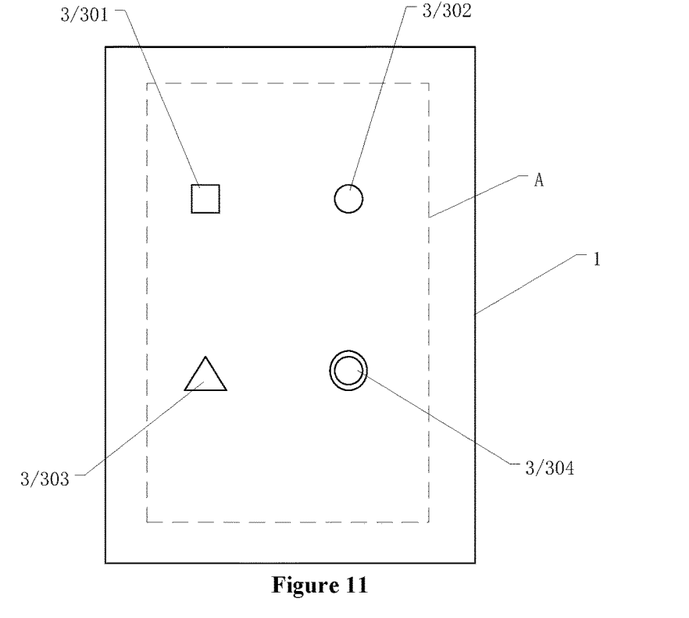
FIG. 11 illustrates a schematic top view of another exemplary display device consistent with disclosed embodiments of the present disclosure.

FIG. 11 illustrates a schematic top view of another display device consistent with disclosed embodiments of the present disclosure. In certain embodiments, referring to FIG. 11, the button structures 3 may include at least two button structures having different shapes.

In one embodiment, referring to FIG. 11, the button structures 3 may include a button structure 301, a button structure 302, a button structure 303, and a button structure 304. The button structure 301 may have a rectangle shape, the button structure 302 may have a circle shape, the button structure 303 may have a triangle shape, and the button structure 304 may have a ring shape. The above-described shape of the button structure is used as an example, which is not limited by the present disclosure. For example, the button structure 3 may have a trapezoidal shape, and a diamond shape, etc. The shape of the button structure may facilitate the user to distinguish different button structures.

In certain embodiments, referring to FIG. 8, the button structure 3 may correspond to at least two touch-control display functions of the display panel. In one embodiment, a same one button structure may correspond to two or more touch-control display functions. Therefore, the utilization of the button structure may be improved, the quantity of the button structures may be reduced, and the production cost of the display panel may be reduced.

Figure 12:
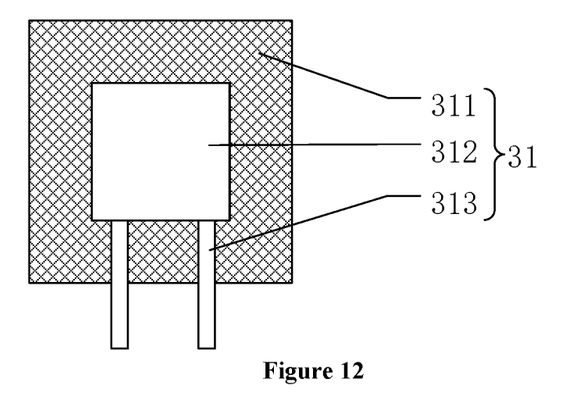
FIG. 12 illustrates a schematic top view of an exemplary actuator consistent with disclosed embodiments of the present disclosure.
Figure 13:
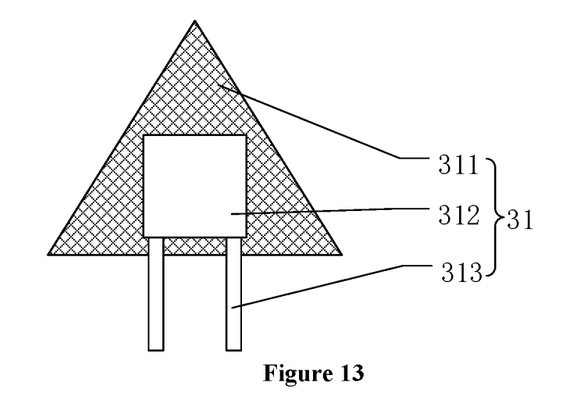
FIG. 13 illustrates a schematic top view of another exemplary actuator consistent with disclosed embodiments of the present disclosure.
Figure 14:
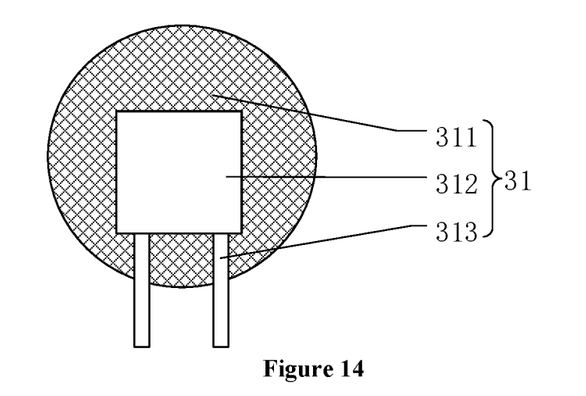
FIG. 14 illustrates a schematic top view of another exemplary actuator consistent with disclosed embodiments of the present disclosure.
Figure 15:
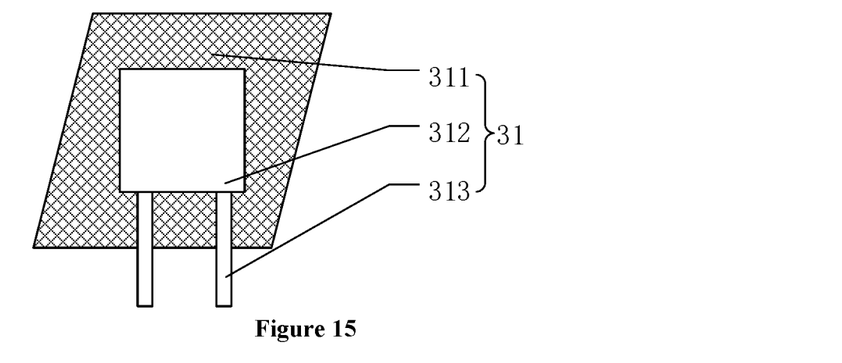
FIG. 15 illustrates a schematic top view of another exemplary actuator consistent with disclosed embodiments of the present disclosure.

FIG. 12 illustrates a schematic top view of an actuator consistent with disclosed embodiments of the present disclosure; FIG. 13 illustrates a schematic top view of another actuator consistent with disclosed embodiments of the present disclosure; FIG. 14 illustrates a schematic top view of another actuator consistent with disclosed embodiments of the present disclosure; and FIG. 15 illustrates a schematic top view of another actuator consistent with disclosed embodiments of the present disclosure. In certain embodiments, referring to FIGS. 12-15, because the actuator 31 has a different shape, the button structure 3 on the display panel may have a different shape. In one embodiment, the actuator 31 may include a metal plate 311, a piezoelectric device 312, and a connection wire 313. The metal plate 311 may have a different shape, and, thus, the actuator 31 may have a different shape. The raised actuator 31 may cause the flexible display panel to form a protrusion, and the protrusion of the flexible display panel may have a same shape as the metal plate. In one embodiment, the actuator may include a piezoelectric actuator, a thin actuator, or other type of actuator. The actuator having a shape such as a triangle, a circle, a rectangle, and a parallelogram is used as an example, which is not limited by the present disclosure.

Figure 16:
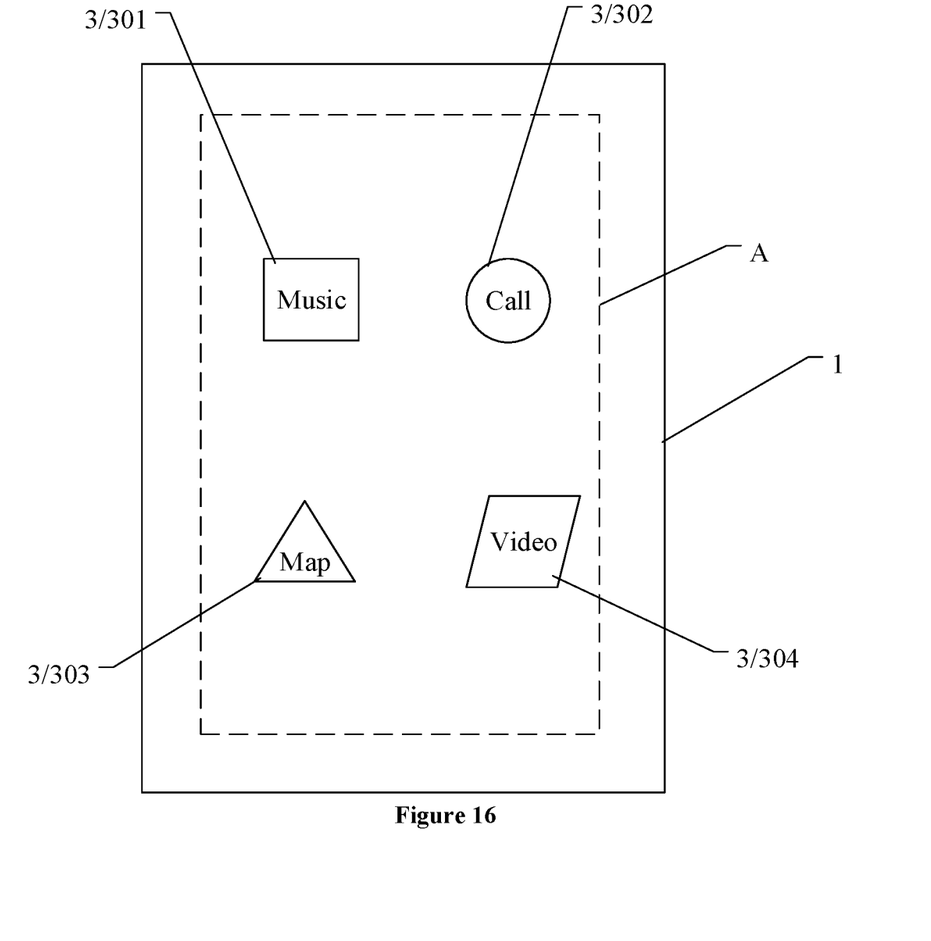
FIG. 16 illustrates a schematic top view of another exemplary display device consistent with disclosed embodiments of the present disclosure.
Figure 17:
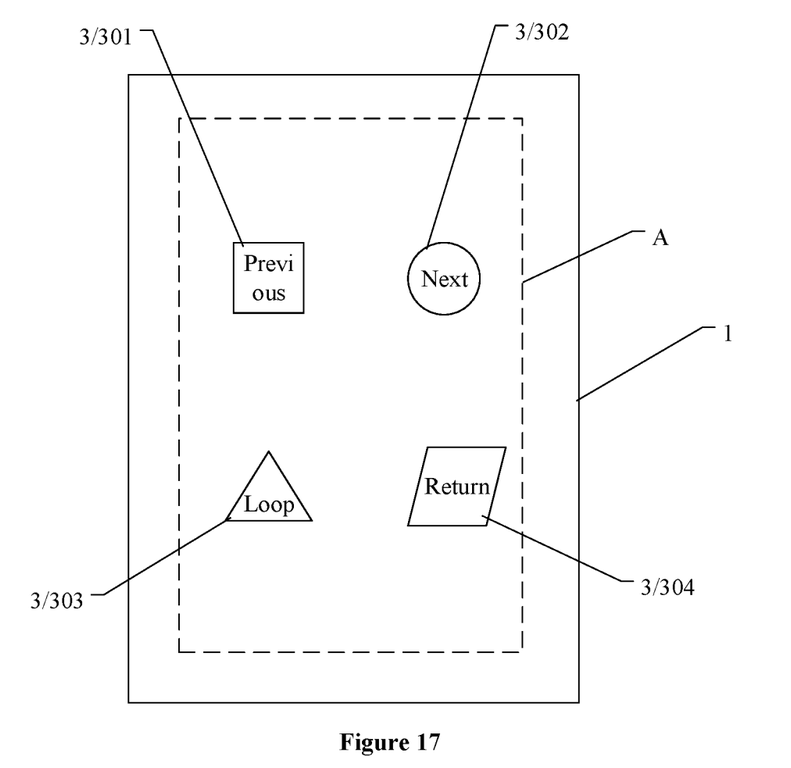
FIG. 17 illustrates a schematic top view of another exemplary display device consistent with disclosed embodiments of the present disclosure.

FIG. 16 illustrates a schematic top view of another display device consistent with disclosed embodiments of the present disclosure; and FIG. 17 illustrates a schematic top view of another display device consistent with disclosed embodiments of the present disclosure. In certain embodiments, referring to FIGS. 16-17, the button structure 3 may correspond to at least two touch-control display functions of the display panel. For example, the button structure 301 may correspond to a "Music" function. When the user confirms the selection of the "Music" function, the display object of the display panel may be "Music". Correspondingly, the function corresponding to the button structure 301 may be "Previous", the function corresponding to the button structure 302 may be "Next", the function corresponding to the button structure 303 may be "Loop", and the function corresponding to button structure 304 may be "Return", etc. The above-described function is used as an example. The type of the touch-control display function corresponding to the button structure, and the quantity of the touch-control display functions corresponding to the button structure are not limited by the present disclosure.

Figure 18:
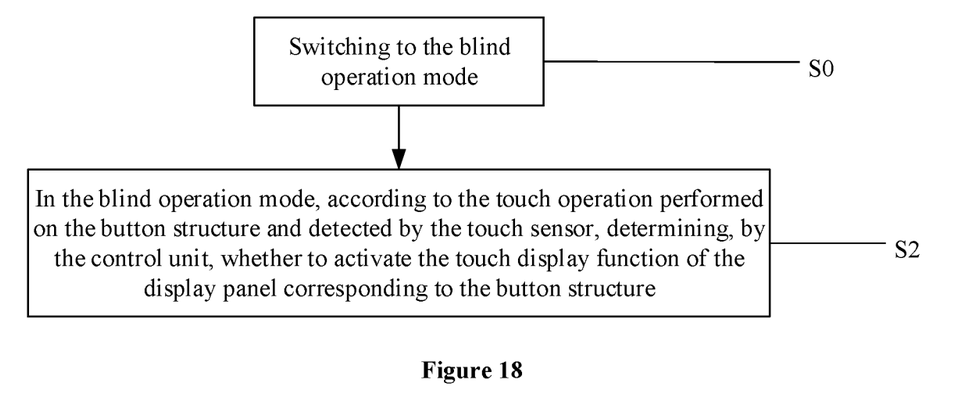
FIG. 18 illustrates a flow chart of an exemplary haptic feedback display method of a display device consistent with disclosed embodiments of the present disclosure.

FIG. 18 illustrates a flow chart of a haptic feedback display method of a display device consistent with disclosed embodiments of the present disclosure. Referring to FIGS. 2-3, FIG. 5 and FIG. 18, the present disclosure may further provide a haptic feedback display method of a display device. The haptic feedback display method may include the display device in the disclosed embodiments. The operation mode may include a blind operation mode. S2: in the blind operation mode, according to the touch-control operation performed on the button structure 3 and detected by the touch-control sensor 4, the control unit 2 may determine whether to activate the touch-control display function of the display panel 1 corresponding to the button structure 3. In one embodiment, before entering the blind operation mode, the method may further include S0: switching to the blind operation mode.

In one embodiment, the control unit may determine whether to switch to the blind operation mode or trigger the blind operation mode according to the detection result of a touch trajectory by the touch sensor. When the touch trajectory detected by the touch sensor is a preset touch trajectory, the control unit may control the operation mode of the display device to be switched to the blind operation mode or may trigger the blind operation mode. In one embodiment, if the preset touch trajectory is "√", when the touch trajectory detected by the touch sensor is "√", the control unit may control the operation mode of the display device to be switched to the blind operation mode, or may trigger the blind operation mode, thereby facilitating the user to switch the operation mode to the blind operation mode or to trigger the blind operation mode.

In certain embodiments, the preset touch trajectory may be set for switching between the blind operation mode and the normal operation mode or for exiting the blind operation mode. When the touch trajectory detected by the touch sensor is the preset touch trajectory, the control unit may control the operation mode of the display device to be switched from the blind operation mode to the normal operation mode, or the control unit may control the operation mode of the display device to be exited from the blind operation mode. In one embodiment, if the preset touch trajectory is "∧", when the touch trajectory detected by the touch sensor is "∧", the control unit may control the operation mode of the display device to be switched from the blind operation mode to the normal operation mode, or the control unit may control the operation mode of the display device to be exited from the blind operation mode. To distinguish the switching process between different operation modes, the triggering process of the operation mode, or the exiting process of the operation mode, different preset touch trajectories may be set. The preset touch trajectory is not limited by the present disclosure, and may be determined according to practical applications.

In one embodiment, the button structure in the display region may be set as a raised structure. When it is inconvenient for the user to directly view the display panel to perform the touch-control operation, the raised button structure may provide guidance for the user. In other words, according to the guidance of the raised button structure, the user may perform the touch-control operation on the display panel by touching the raised button structure without directly viewing the display panel. Therefore, the user may still be capable of performing operation on the display panel in a case where it is inconvenient to view the display panel, thereby improving the user convenience. In addition, the button structure in the disclosed embodiments may be disposed in the display region of the display panel, which may increase the area of the display region of the display device, reduce the frame of the display device, and improve the user experience.

Figure 19:
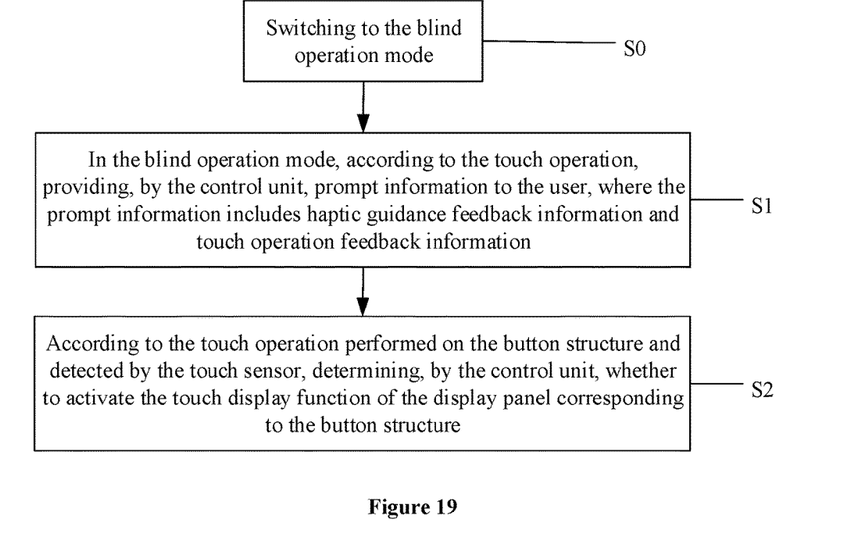
FIG. 19 illustrates a flow chart of another exemplary haptic feedback display method of a display device consistent with disclosed embodiments of the present disclosure.

FIG. 19 illustrates a flow chart of another haptic feedback display method of a display device consistent with disclosed embodiments of the present disclosure. In certain embodiments, referring to FIGS. 2-3, FIG. 5 and FIG. 19, the haptic feedback display method may further include S1. In the blind operation mode, according to the touch-control operation, the control unit 2 may provide prompt information to the user, where the prompt information may include haptic guidance feedback information and touch-control operation feedback information. The haptic guidance feedback information may be used to provide the location information of the button structure 3 to the user and to feedback the touch-control display function of the display panel 1 corresponding to the button structure 3 to the user. The touch-control operation feedback information may be used to feedback information confirming the activation of the display function to the user.

In one embodiment, referring to FIGS. 2-3, FIG. 5 and FIG. 19, after switching to the blind operation mode, according to the detected touch-control operation, the control unit may provide the haptic guidance feedback information and the touch-control operation feedback information to the user. When the user touches the display device, after touching the raised button structure 3, the user may know the location of the button structure 3 on the display panel. After touching the button structure 3, the control unit 2 may feedback the type of the touch-control display function of the display panel 1 corresponding to the button structure 3 to the user. For example, when the user knows that the touch-control display function corresponding to the button structure 3 is "Music" according to the feedback from the control unit 2, if the user confirms the selection of "Music" function, the user may perform the next touch-control operation on the button structure 3. After the user performs the next touch-control operation on the button structure 3, the control unit 2 may feedback the information confirming the activation of "Music" function to the user according to the user's next touch-control operation.

In one embodiment, according to the user's touch-control operation performed on the display panel, the feedback information may be provided to the user. Therefore, according to the feedback information, the user may determine the location of the touched button structure and the touch-control display function of the display panel corresponding to the button structure, and may confirm the activation of the touch-control display function. The feedback information may guide the user to perform the touch-control operation on the display panel, thereby improving the user convenience.

In certain embodiments, referring to FIG. 19, a prompt signal of the prompt information may include a vibration signal or a voice signal. A prompt signal of the haptic guidance feedback information may be a first prompt signal, and a prompt signal of the touch-control operation feedback information may be a second prompt signal. The first prompt signal may be different from the second prompt signal.

In certain embodiments, referring to FIG. 19, the first prompt signal of the haptic guidance feedback information may include a first vibration signal, and the second prompt signal of the touch-control operation feedback information may include a second vibration signal. A vibration amplitude of the first vibration signal may be greater than a vibration amplitude of the second vibration signal, and a vibration frequency of the first vibration signal may be greater than a vibration frequency of the second vibration signal.

In one embodiment, according to the user's touch-control operation performed on the display panel, different feedback information may be provided to the user. Therefore, according to the feedback information, the user may determine the location of the touched button structure and the touch-control display function of the display panel corresponding to the button structure, and may confirm the activation of the touch-control display function. The feedback information may guide the user to perform the touch-control operation on the display panel, thereby improving the user convenience.

Figure 20:
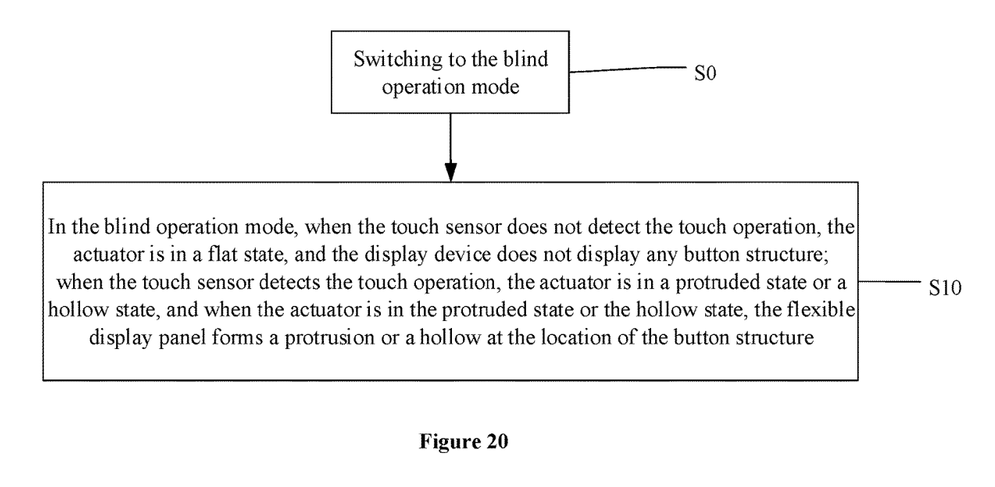
FIG. 20 illustrates a flow chart of another exemplary haptic feedback display method of a display device consistent with disclosed embodiments of the present disclosure.

FIG. 20 illustrates a flow chart of another haptic feedback display method of a display device consistent with disclosed embodiments of the present disclosure. In certain embodiments, referring to FIG. 2, FIG. 5, FIG. 9 and FIG. 20, the haptic feedback display method may further include S10. In the blind operation mode, when the touch-control sensor 4 does not detect the touch-control operation, the actuator 31 may be in a flat state, and the display device may not display any button structure 3; when the touch-control sensor 4 detects the touch-control operation, the actuator 31 may be in a raised state or a recessed state, and the flexible display panel 11 at the location of the button structure 3 may form a protrusion or a recess when the actuator 31 is in the raised state or the recessed state.

In one embodiment, in the blind operation mode, if the user does not perform any touch-control operation on the display device, the entire plane of the display panel may be in a flat state, and, thus, the display panel may have desired display performance. Because the actuator does not start working, the power usage of the display device may be reduced. After the user performs the touch-control operation on the display device, the actuator under the display panel may start working, such that the display panel may form a raised or recessed surface, which may provide touch-control guidance for the user. Therefore, the user may still be capable of performing touch-control operation on the display panel in a case where it is inconvenient to view the display panel, thereby improving the user convenience.

In certain embodiments, referring to FIG. 2, the touch-control operation performed on the button structure and detected by the touch-control sensor 4 may include at least a click, a double-click, and a multiple consecutive press.

In one embodiment, the user's touch-control operation performed on the display device may include at least a click, a double-click, a multiple consecutive press, a long-duration press, a short-duration press, a light-press, and a heavy-press, etc. The above-described touch-control operation is used as an example, which is not limited by the present disclosure.

In the display device and the haptic feedback display method of the display device in the disclosed embodiments, in the blind operation mode, the button structure in the display region may be set as a raised structure. When it is inconvenient for the user to directly view the display panel to perform the touch-control operation, the raised button structure may provide guidance for the user. In other words, according to the guidance of the raised button structure, the user may perform the touch-control operation on the display panel by touching the raised button structure without directly viewing the display panel. Therefore, the user may still be capable of performing operation on the display panel in a case where it is inconvenient to view the display panel, thereby improving the user convenience. In addition, the button structure in the disclosed embodiments may be disposed in the display region of the display panel, which may reduce the frame of the display device, increase the area of the display region of the display device, and improve the user experience.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments illustrated herein but is to be accorded the widest scope consistent with the principles and novel features disclosed herein.

What is claimed is:

1. A display device, comprising:
a display panel, including a display region and a touch-control sensor, wherein the touch-control sensor is disposed at least in the display region and is used to detect a touch-control operation;
a control unit, electrically connected to at least the display panel, wherein the control unit is used to change an operation mode of the display device, and according to the touch-control operation detected by the touch-control sensor, to adjust a display object of the display panel, wherein the operation mode includes at least a blind operation mode; and
at least one button structure, disposed in the display region, wherein in the blind operation mode, a touch surface of the display device is in a raised state at a location of a button structure of the at least one button structure, wherein:
the touch-control sensor is one of a plurality of separate individual touch-control electrodes;
a distribution density of the plurality of separate individual touch-control electrodes in the display region includes at least a first distribution density and a second distribution density, wherein the first distribution density is greater than the second distribution density; and
at least at the location of the button structure, the distribution density of the plurality of separate individual touch-control electrodes is the first distribution density.

2. The display device according to claim 1, further including:
a glass cover, disposed on a side of the display panel close to the touch surface of the display device, wherein the button structure is disposed on a side of the glass cover away from the display panel, and the button structure has a block shape.

3. The display device according to claim 2, wherein:
a thickness of the button structure in a direction perpendicular to a panel plane of the display panel is in a range of approximately 0.3 mm-1.0 mm.

4. The display device according to claim 2, wherein:
in a panel plane of the display panel, the display panel includes a first side and a second side that are oppositely disposed, and a third side and a fourth side that are oppositely disposed, wherein the button structure is disposed on at least one side of the display panel.

5. The display device according to claim 2, wherein:
the button structure is an optically transparent button structure and is made of a material including glass or plastic.

6. The display device according to claim 1, wherein:
the display panel is a flexible display panel, and
the button structure is disposed on a side of the display panel away from the touch surface and includes an actuator, wherein:
the actuator includes at least a raised state, wherein the actuator forms a protrusion toward a location of the flexible display panel, and
when the actuator is in the raised state, at the location of the button structure, the actuator supports the flexible display panel to form a protrusion of the flexible display panel.

7. The display device according to claim 6, wherein:
in the blind operation mode, the actuator has a vibration state.

8. The display device according to claim 6, wherein:
the at least one button structure is evenly distributed in the display region.

9. The display device according to claim 6, wherein:
in the blind operation mode, the actuator further includes a recessed state, wherein the actuator forms a recess in a direction away from the flexible display panel, and
when the actuator is in the recessed state, the actuator drives the flexible display panel to form a recess at the location of the button structure.

10. The display device according to claim 6, wherein:
the operation mode further includes a normal operation mode, and
in the normal operation mode, the actuator is in a flat state.

11. The display device according to claim 1, wherein:
the at least one button structure includes at least two button structures having different shapes.

12. The display device according to claim 1, wherein:
the button structure corresponds to at least two touch-control display functions of the display panel.

13. A haptic feedback display method of a display device, comprising:
providing the display device, the display device including:
a display panel, including a display region and a touch-control sensor, wherein the touch-control sensor is disposed at least in the display region and is used to detect a touch-control operation,
a control unit, electrically connected to at least the display panel, wherein the control unit is used to change an operation mode of the display device, and according to the touch-control operation detected by the touch-control sensor, to adjust a display object of the display panel, wherein the operation mode includes at least a blind operation mode, and
at least one button structure, disposed in the display region, wherein in the blind operation mode, a touch surface of the display device is in a raised state at a location of a button structure of the at least one button structure; and
in the blind operation mode, according to the touch-control operation performed on the button structure and detected by the touch-control sensor, determining, by the control unit, whether to activate a touch-control display function of the display panel corresponding to the button structure,
wherein, in the blind operation mode, according to the touch-control operation, the control unit provides prompt information to a user, wherein:
the prompt information includes haptic guidance feedback information and touch-control operation feedback information,
the haptic guidance feedback information is used to provide location information of the button structure to the user and to feedback the touch-control display function of the display panel corresponding to the button structure to the user, and
the touch-control operation feedback information is used to feedback information confirming activation of the touch-control display function to the user.

14. The haptic feedback display method according to claim 13, wherein:
a prompt signal of the prompt information includes one of a vibration signal and a voice signal.

15. The haptic feedback display method according to claim 14, wherein:
   a prompt signal of the haptic guidance feedback information is a first prompt signal, and a prompt signal of the touch-control operation feedback information is a second prompt signal, wherein the first prompt signal is different from the second prompt signal.

16. The haptic feedback display method according to claim 15, wherein:
   the first prompt signal of the haptic guidance feedback information includes a first vibration signal, and the second prompt signal of the touch-control operation feedback information includes a second vibration signal, wherein a vibration amplitude of the first vibration signal is greater than a vibration amplitude of the second vibration signal, and a vibration frequency of the first vibration signal is greater than a vibration frequency of the second vibration signal.

17. The haptic feedback display method according to claim 13, wherein:
   the display panel is a flexible display panel, and
   the button structure is disposed on a side of the display panel away from the touch surface and includes an actuator, wherein:
      the actuator includes at least a raised state, wherein the actuator forms a protrusion toward a location of the flexible display panel, and
      when the actuator is in the raised state, at the location of the button structure, the actuator supports the flexible display panel to form a protrusion of the flexible display panel; and
   in the blind operation mode,
   when the touch-control sensor does not detect the touch-control operation, the actuator is in a flat state, and the display device does not display any button structure,
   when the touch-control sensor detects the touch-control operation, the actuator is in a raised state or a recessed state, and
   when the actuator is in the raised state or the recessed state, the flexible display panel forms a protrusion or a recess at the location of the button structure.

18. The haptic feedback display method according to claim 13, wherein:
   the touch-control operation performed on the button structure and detected by the touch-control sensor includes at least one of a click, a double-click, and a multiple-consecutive press.

* * * * *